UNITED STATES PATENT OFFICE.

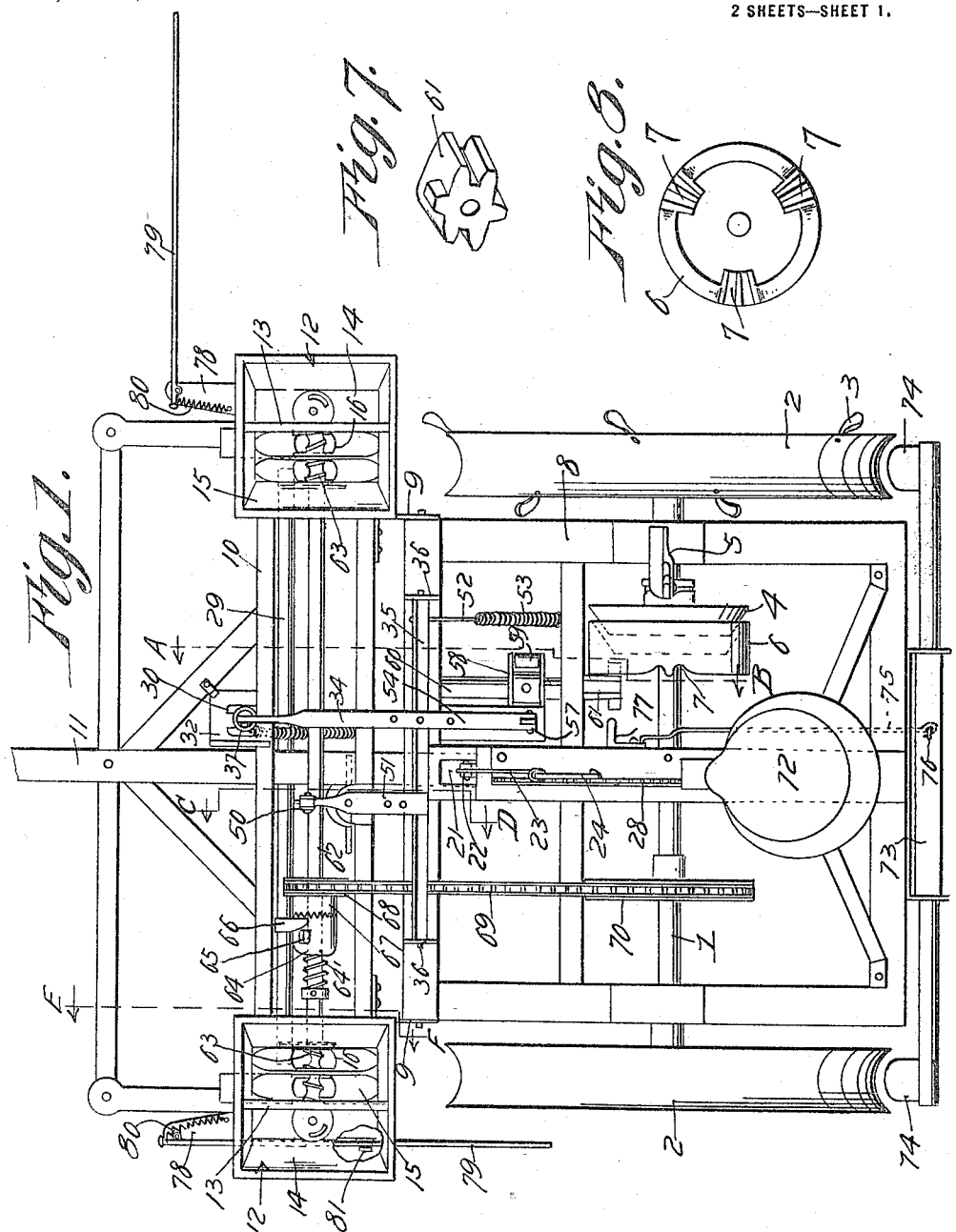

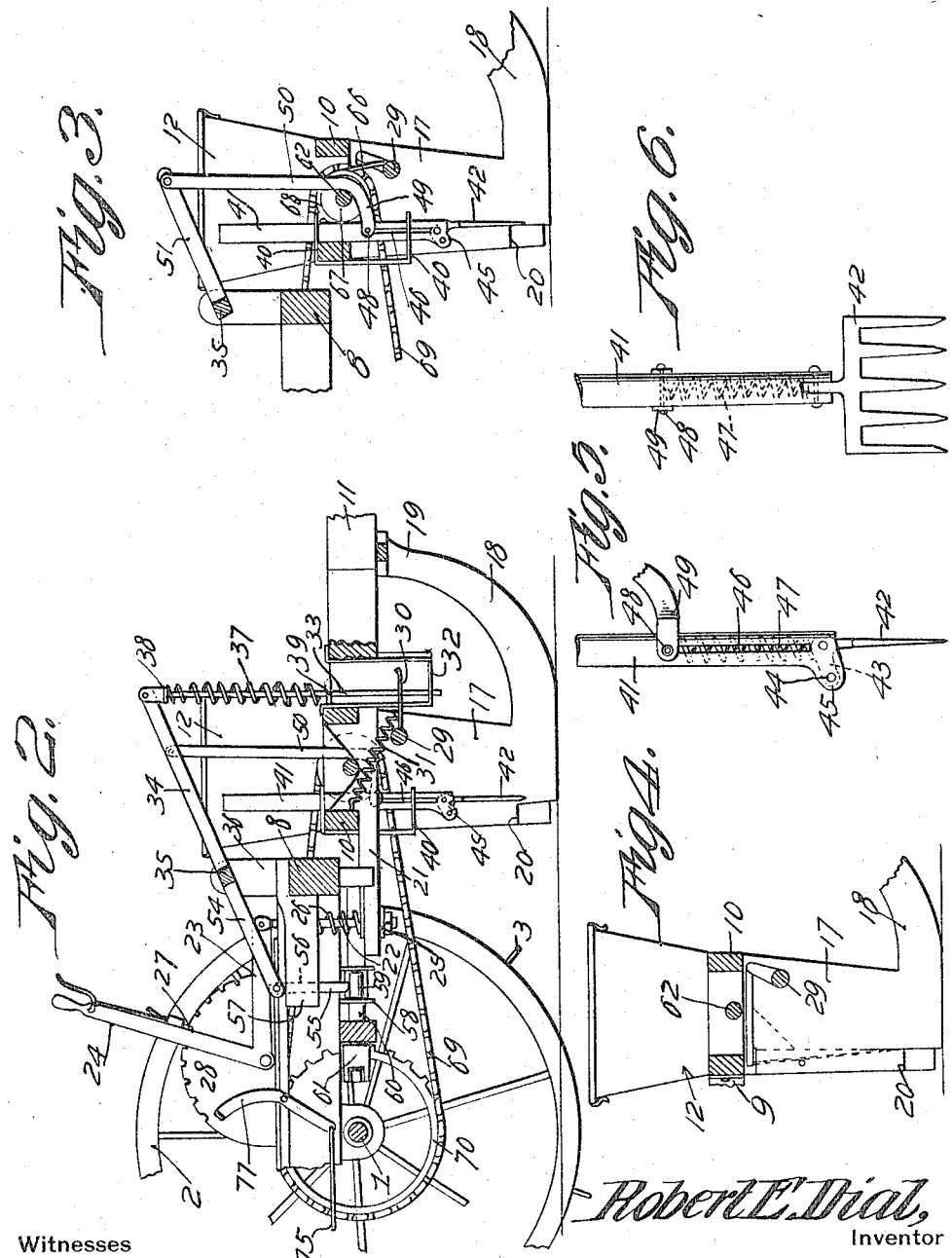

ROBERT E. DIAL, OF ATHERTON, INDIANA, ASSIGNOR OF ONE-HALF TO JOSEPH C. STARK, OF ATHERTON, INDIANA.

COMBINED PLANTER AND FERTILIZER-DISTRIBUTER.

1,216,419. Specification of Letters Patent. Patented Feb. 20, 1917.

Application filed June 10, 1916. Serial No. 102,907.

*To all whom it may concern:*

Be it known that I, ROBERT E. DIAL, a citizen of the United States, residing at Atherton, in the county of Vigo and State of Indiana, have invented a new and useful Combined Planter and Fertilizer-Distributer, of which the following is a specification.

This invention relates to a combined planter and fertilizer distributer of the check row type in which check wires are not employed, and is more particularly designed as an improvement upon the structure disclosed in Patent No. 704,622, issued to me and M. E. Garwood on July 15, 1902.

One of the objects of the invention is to provide a continuously rotating actuating mechanism having means under the control of the supporting wheels of the machine, for coupling said mechanism to an agitating shaft whereby the shaft will complete one revolution each time it is coupled to the mechanism and will then be automatically uncoupled, thereby to thoroughly agitate the contents of the hoppers.

A further object is to provide coupling and uncoupling mechanism including a rock shaft which controls the dropping of material to the ground from the hoppers.

A still further object is to provide a marker of novel form designed to work up and down relative to the body of the machine and which is capable of shifting out of its normal position relative to its operating mechanism should it come into contact with an unyielding obstruction, thus preventing injury to the mechanism.

Another object is to provide indicators of novel form for use in connection with the machine, said indicators being so mounted as to wipe past trees or other obstructions in the paths thereof without injury but being designed to automatically return to their active positions after they have passed the obstruction.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a plan view of the machine, one of the indicators being extended laterally from the machine.

Fig. 2 is a section on line A—B Fig. 1.
Fig. 3 is a section on line C—D Fig. 1.
Fig. 4 is a section on line E—F Fig. 1.
Fig. 5 is a side elevation of the marking fork.
Fig. 6 is a front elevation of the structure shown in Fig. 5.
Fig. 7 is a perspective view of one of the mutilated gears forming a part of the dropper operating mechanism.
Fig. 8 is a face view of another mutilated gear forming a part of said mechanism.

Referring to the figures by characters of reference 1 designates an axle supported by wheels 2 one of which may be provided with any suitable means, such as wings, 3 for preventing it from slipping longitudinally upon the ground, the rims of the wheels being preferably concaved transversely so as to prevent lateral slipping or skidding. The axle 1 rotates with the wheels and feathered on the axle is a conical clutch member 4 adapted to be shifted in any suitable manner, as by means of a lever 5, so as to move into or out of engagement with a clutch member 6 which is loosely mounted on the shaft or axle 1. This clutch member 6 is provided, on one face, with a mutilated gear 7 the teeth of which are grouped together at intervals of approximately 90 degrees. Obviously when the clutch member 4 is shifted into the member 6, the mutilated gear 7 will be coupled to axle 1 whereas, when the clutch member 4 is shifted in the opposite direction, the mutilated gear will be uncoupled from the shaft.

A frame 8 is tiltably mounted on the axle 1 and the front end of the frame is extended between and pivotally connected to brackets 9 which extend rearwardly from a front or supplemental frame 10 to which is fixedly connected a draft tongue 11. A hopper 12 is mounted on each side portion of the front frame 10 and each hopper is preferably divided, by a partition 13, into a seed compartment 14 and a fertilizer compartment 15. Openings 16 are provided in the bottom of the fertilizer compartment and discharge into the upper portion of a boot 17 which is connected to the rear portion of a runner 18. The front or upper ends of the runners are connected by a cross bar 19 which is secured to the draft tongue 11. It is of course to be understood that each of the boots is divided longitudinally to form separate passages for the contents of the respective compartments of the hopper above the boots and that each of these passages is provided with a valve of the usual type. As the dropping mechanism constitutes no part of the present invention, it is not deemed necessary to show or describe it in detail. It might be stated, however, that the inner side of each boot is cut away, as shown at 20 so that the contents of the inner compartment 15 of each hopper, when discharged into the inner passage in the boot thereunder, will spread laterally to a slight extent onto the ground so it can be easily seen by the driver, particularly where the material contained in the compartment 15 is fertilizer.

The tongue 11 has an extension 21 which projects under the front portion of the main or tiltable frame 8 and this extension is slidably engaged by a rod 22 attached to an arm 23 extending forwardly from the pivoted end of an adjusting lever 24. A collar 25 is provided on the lower end of the rod 22 for limiting the upward movement of the rod within the extension 21 and a spring 26 is mounted on the rod and bears at its lower end upon the extension 21 and at its upper end against a portion of the frame 8. As the front portion of the tongue 11 is designed to be supported by the draft animal, it will be apparent that when arm 23 is swung upwardly it will pull upwardly through rod 22 upon the extension 21 and thus cause the rear portion of tongue 11 to swing upwardly, correspondingly swinging the front end portion of the frame 8 and thus causing the front or supplemental frame 10 to be elevated. This will lift the runners 18 out of contact with the ground. By reversing the movement of the arm 23 the runners can be lowered onto the ground. Lever 24 is preferably provided with a dog 27 coöperating with a toothed segment 28 whereby the lever can be locked in any position to which it may be adjusted.

A rock shaft 29 is journaled at its ends within the upper portions of the boots 17 and the ends of this rock shaft are preferably connected to the valves within the boots and which have not been shown. Extending forwardly from the rock shaft is a fork 30 and connected to this fork and to the back portion of the front frame 10 is a spring 31 which holds the shaft yieldingly in a predetermined position. The fork 30 overhangs a bracket 32 which is suspended from the front portion of frame 10 and slidably mounted within this bracket and also within the fork 30 is a plunger 33 pivotally connected at its upper end to a lever 34. This lever extends from a rock shaft 35 mounted in brackets 36 which extend upwardly from the front end portion of the frame 8. A spring 37 is mounted on the rod 33 and bears at its upper end against a stop collar 38 while its lower end bears against a sleeve 39 slidably mounted on the rod 33.

Guide brackets 40 are extended from the rear portion of the frame 10 and slidably mounted in these brackets is a stem 41 to the lower end of which is pivotally connected a fork 42. An ear 43 is formed integral with the fork and extends from the pivotal portion thereof, this ear being normally held against movement relative to the stem 41 by a break pin 44 formed of wood or the like and which is extended through ears 45 on the stem 41. Longitudinal slots 46 are formed in stem 41 at diametrically opposed points and housed within the stem and between the slots is a coiled spring 47. A pin 48 is extended transversely through the stem and is slidably mounted in the slots, this pin bearing downwardly on the spring 47. Said pin is connected to the forked end 49 of a hanger 50 which is pivotally connected to an arm 51 extending forwardly from the rock shaft 35.

Extending rearwardly from the shaft 35 is an arm 52 connected by a spring 53 to the frame 8, this spring and the arm attached thereto serving to hold the hanger 50 and the rod 33 normally elevated as shown in Figs. 2 and 3.

An arm 54 is extended rearwardly from the rock shaft and has a hanger 55 pivotally connected thereto and slidably mounted within an opening 56 formed in a block 57 which is fixedly connected to the front portion of the frame 8. This hanger normally extends in the path of a lifting cam made up of spaced arms 58 connected by one or more rollers 59. The cam is attached to a longitudinal shaft 60 journaled in the frame 8 and having a mutilated gear 61 designed to be actuated by the mutilated gear 7. The parts are so located and proportioned that when shaft 60 is rotated in one direction, the rollers 59 of the cam will be brought successively to position under the hanger 55 and will thrust said hanger upwardly, thus actuating the shaft 35 and the parts connected thereto.

A shaft 62 is journaled at its ends within the bottom portions of the hoppers 12, this shaft being provided at its ends with suitable agitating means such as worms 63 and also with suitable seed dropping means not shown. A clutch member 64 is feathered on the shaft and has a finger 65 extending from the periphery thereof. A shifting finger 66 is extended from the rock shaft 29 and the spring 31 serves to hold this shifting finger 66 normally pressed against the periphery of the clutch member 64. Another clutch member 67 is mounted for rotation on the shaft 62 and has a sprocket 68 designed to be continuously rotated by a chain 69 engaging a sprocket 70. This sprocket is secured to the axle 1.

A seat 72 is provided for the driver upon the rear portion of frame 8 and a transverse shaft 73 is journaled upon the rear end of the frame 8 and carries scrapers 74 designed to be shifted into and out of engagement with the peripheries of the wheels 2. This scraper can be actuated by means of a rod 75 extending from a depending arm 76 on the shaft 73 and attached to a foot lever 77 located in front of and close to the seat 72.

Pivotally connected to a bracket 78 extending forwardly from the outer side of each hopper 12 is an indicating arm 79 the inner end of which is connected by a spring 80 to the bracket 78 so that said indicating arm will be normally extended laterally from the machine. When the arm is not in use as an indicator it can be swung backwardly and inwardly against the side of the machine and placed in engagement with a hook 81 extending from the outer side of the adjacent hopper. By lifting the arm out of engagement with the hook 81, the spring 80 will swing the arm outwardly to its laterally extended position as shown at the right of Fig. 1.

Under ordinary conditions when the machine is drawn forward the mutilated gear 6 will remain stationary and all parts controlled thereby will also remain stationary. However, as sprocket 70 rotates with the axle 1, the chain 69 and sprocket 68 will continuously rotate. The clutch members 67 and 64 however, will be held out of engagement with each other because finger 65 will engage finger 66 and thus cause the clutch member 64 to be shifted laterally against the action of the spring 64' which bears against said clutch member. When it is desired to operate the dropping mechanism, clutch 4 is shifted into engagement with clutch 6, thus coupling the mutilated gear 7 to the axle 1. Consequently, during the rotation of the axle, the shaft 60 will be intermittently rotated. During each movement of the shaft 60 one of the rollers 59 will come against and elevate the hanger 55 with the result that shaft 35 will be rotated and the lever 34 and arm 51 will be swung downwardly. The downward movement of lever 34 will cause sleeve 39 to come against fork 30 and rock shaft 29 which will open the valves in the boots 17 and at the same time shift the finger 66 out of engagement with finger 65. Consequently, spring 64' will shift clutch member 64 into engagement with clutch member 67 and sprocket 68 will thus be coupled to shaft 62. The rocking of shaft 29 is only momentary and the finger 66 will move back against the clutch member 64 but as shaft 60 rotates intermittently, finger 66 will again move away from clutch member 64 before it can be engaged by finger 65, the parts working in properly timed relation. Thus shaft 62 will rotate continuously, but should clutch member 64 be shifted laterally out of engagement with clutch 67 shaft 60 and finger 66 would remain stationary and said finger would engage finger 65 and uncouple the clutch members 64 and 67. The downward movement of arm 51 will result in the downward shifting of the stem 41 and fork 42 will thus be pressed into the soil and will make a mark which will be plainly discernible during the return trip of the machine along the next adjoining row. By providing the spring pressed sleeve 39 for engaging fork 30, there is no danger of any of the parts becoming broken should some of the mechanism become clogged or be held against action from any other cause. Likewise by providing a spring 47, the same will become compressed should the fork 42 be lowered against an unyielding obstruction. Should the fork be forced into the ground and not lift readily therefrom, pin 44 will break, thus permitting the fork to swing about its pivotal connection with the stem 41 and preventing injury to any of the mechanism of the machine.

The indicators 79 serve as means for properly placing the machine at the beginning of a row, these indicators pointing to one of the marks made by the fork 42.

The indicators 79 can obviously come against any obstructions in the path thereof and then swing rearwardly out of the way, after which they will return to their normal positions as soon as the obstruction has been passed. Thus no injury to the machine will be caused.

What is claimed is:—

1. In a machine of the class described, the combination with a valve controlling rock shaft and a revoluble dropper shaft, of a drive member revolubly mounted on the dropper shaft, a clutch member coöperating therewith and feathered on said shaft, coöperating means upon the rock shaft and clutch member for holding said clutch member disengaged from the drive member, an intermittently revoluble shaft, a cam carried thereby, a member shiftable by the cam, and means operated by said shiftable member for momentarily actuating the rock shaft.

2. In a machine of the class described, the combination with a valve controlling rock shaft and a revoluble dropper shaft, of a drive member revolubly mounted on the dropper shaft, a clutch member coöperating therewith and feathered on said shaft, coöperating means upon the rock shaft and clutch member for holding said clutch member disengaged from the drive member, an intermittently revoluble shaft, a cam carried thereby, a hanger shiftable by the cam, and means operated by the hanger for momentarily actuating the rock shaft, said means including a fork upon the rock shaft, a hanger, a connection between the two hangers, and yieldingly held means upon one of the hangers for engaging the fork.

3. In a machine of the class described, the combination with a revoluble dropper shaft, a drive member mounted for rotation thereon, and a clutch member feathered on said shaft for coupling the drive member thereto, said clutch member being yieldingly held, of an outstanding projection upon said clutch member, a valve actuating rock shaft, a shifting finger upon said shaft and normally projecting into the path of the projection to shift the clutch member out of engagement with the drive member, a shaft, a cam thereon, means operated by the supporting wheels of the machine for intermittently actuating said shaft, a plunger upon the cam and shiftable thereby, and means operated by the plunger for actuating the rock shaft to release the clutch member.

In testimony that I claim the foregoing as my own, I have hereto affixed my signature in the presence of two witnesses.

ROBERT E. DIAL.

Witnesses:
 LLOYD DIAL,
 J. J. HIGGINS.

Copies of this patent may be obtained for five cents each, by addressing the "Commissioner of Patents, Washington, D. C."